FREQUENCY MULTIPLIER AND SPECTRUM GENERATOR
Filed April 13, 1967
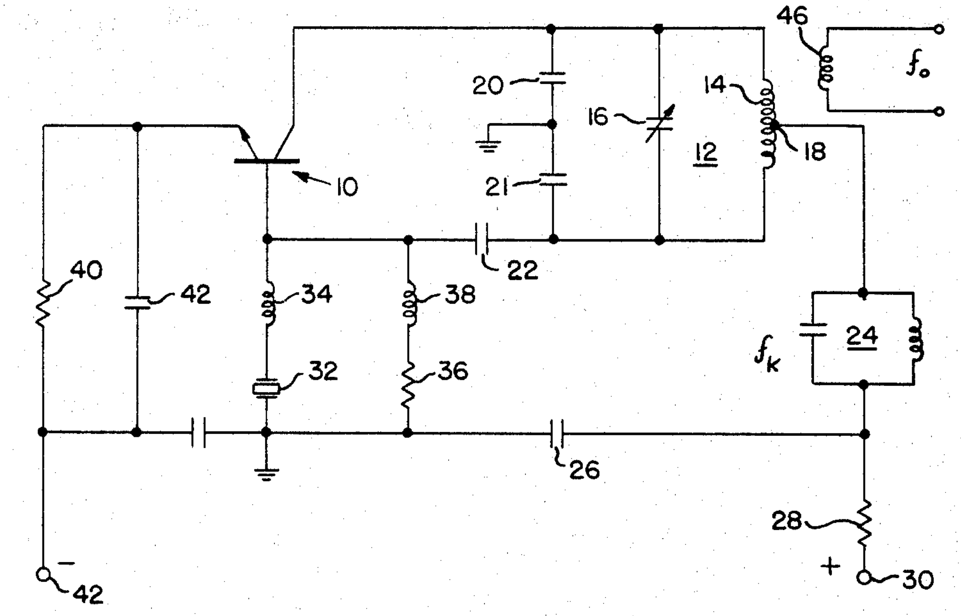
INVENTOR.
ALWIN HAHNEL
BY Hoffman Stone
ATTORNEY United States Patent Office 3,419,817
Patented Dec. 31, 1968

3,419,817

FREQUENCY MULTIPLIER AND SPECTRUM GENERATOR

Alwin Hahnel, Rochester, N.Y., assignor to Stromberg Carlson Corporation, Rochester, N.Y., a corporation of Delaware Filed Apr. 13, 1967, Ser. No. 630,675
2 Claims. (Cl. 331—116)

ABSTRACT OF THE DISCLOSURE

A frequency multiplier and spectrum generator of the phase controlled, keyed type including two tank circuits energized by a single transistor. One tank circuit is crystal controlled to oscillate at a relatively low frequency. The second tank circuit is tunable over a wide range of frequencies, all higher than the frequency of the crystal controlled tank. The crystal controlled tank keys the transistor and the high frequency tank on and off. The output of the high frequency tank includes only harmonics of the crystal controlled tank, with maximum energy concentrated near the frequency to which the high frequency tank is tuned. The crystal controlled tank is connected to the transistor through a virtual ground point in the coil of the high frequency tank.

*Summary of the invention*

This invention relates to a novel frequency multiplier and spectrum generator circuit, and, more particularly, to an improvement in the circuit described and claimed in my previous patent No. 2,745,963.

The circuit of my previous patent may be characterized as one in which a high frequency oscillator circuit is periodically keyed and phase controlled at an accurately controlled rate which is a sub-harmonic of the frequency of the desired output signal, or of the mid-frequency of a desired group of output signals that constitute a spectrum. The circuit of the present invention represents an improvement over the previously patented circuit in that it enables highly efficient operation for output frequencies as low as about ten times the keying frequency while still maintaining the ability to produce output signals of at least about 500 times the keying frequency with a very high concentration of energy at the output frequency and a high degree of suppression of unwanted harmonics.

Similarly to the patented circuit, the circuit of the present invention includes two tank circuits energized from a common energizing source such as a vacuum tube or transistor. The keying tank circuit operates at a lower frequency than the keyed circuit and serves to key the energizing source alternately on and off. The keyed circuit is tuned to a frequency fairly close to the desired output frequency, and its output consists of pulses of alternating current or voltage, each one of the pulses comprising a regenerative period at its beginning, an intermediate period of oscillation at a substantially uniform output level, and a degenerative period at the end of the pulse. By Fourier analysis, it has been shown that due to the phase control feature, the output signal comprises only harmonics of the keying rate, and when the keyed circuit is arranged to have a high Q characteristic, the output energy is very strongly concentrated at a single harmonic of the keying rate.

In the circuit of my previous patent, a choke or isolation coil was connected between the keying tank and the keyed tank to minimize undesired inter-effects between the two tanks. The presence of the coil limits the operation of the circuit with respect to the generation of signals of relatively low frequencies and the circuit is of relatively reduced effectiveness when it is used to produce an output signal at a frequency less than about forty times the keying frequency.

Briefly, the improvement of the present invention resides primarily in connecting the keying tank to a point at virtual ground on the coil of the keyed tank, thereby obviating the need of the isolating coil and substantially completely isolating the two tanks from each other regardless of the output frequency, which in the present circuit may be as low as about ten times the keying frequency.

*Detailed description*

A presently preferred embodiment of the invention will now be described in connection with the accompanying drawing, wherein the single figure is a schematic diagram with certain conventional portions omitted of a harmonic generator according to the invention.

As shown, the circuit includes two oscillators energized by a single transistor 10. The first oscillator includes a tank circuit 12 having a coil 14 and a variable capacitor 16. The tank circuit 12 is tuned to a relatively high frequency near or at the desired output frequency, $f_0$. A virtual ground is provided at an intermediate point 18 along the coil 14 by connecting a pair of auxiliary capacitors 20 and 21 in series with each other across the coil 14 and grounding the common terminal between the capacitors 20 and 21. The relative values of the capacitors 20 and 21 are chosen in accordance with the feed back requirements of the high frequency oscillator and the characteristics of the transistor 10. One end of the tank circuit 12 is connected directly to the collector of the transistor 10, and the other end is connected through a coupling capacitor 22 to the base of the transistor 10.

The second oscillator is crystal controlled and includes a tank circuit 24, one end of which is connected to the virtual ground point 18 in the coil of the high frequency tank. The other end of the tank 24 is connected through a coupling capacitor 26 to ground, and through a limiting resistor 28 to the positive battery terminal 30. The crystal 32 is connected in series with an inductor 34 between the base of the transistor 10 and ground. A base resistor 36 is connected in series with a choke 38 between the base of the transistor 10 and ground. The emitter of the transistor is connected through a resistor 40 to the negative battery terminal 42. In the conventional way, a capacitor 44 is connected in shunt with the emitter resistor 40.

The output from the high frequency tank 12 may be delivered to any desired utilization circuit by any desired means such as, for example, by inductively coupling an output coil 46 to the coil 14 of the tank.

With the tank 24 of the keying oscillator connected to the virtual ground point 18 of the high frequency coil, the keying circuit does not load the high frequency circuit except to the negligible extent that the point of connection 18 may, in practice, be spaced from the actual virtual ground point. In addition, the current path between the keying tank 24 and the collector of the transistor 10 is of very low impedance at the keying frequency. This factor improves the action of the circuit by shortening the regenerative and degenerative periods in the output of the high frequency oscillator and thereby achieving an improved concentration of energy at the desired output frequency, and improved suppression of undesired adjacent harmonics.

I claim:

1. A frequency multiplier comprising a transistor, a first resonant circuit connected to be driven through said transistor and tunable to a frequency in the general range of the frequency of a desired output signal, said first resonant circuit having a coil connected between two electrodes of said transistor, a second resonant circuit connected to be driven by said transistor and arranged for oscillation at a sub-harmonic of the desired output frequency, means establishing a virtual ground in said coil of said first resonant circuit at a point intermediate between its end terminals, said second resonant circuit being connected to one of the electrodes of said transistor through said virtual ground of said coil of said first resonant circuit and being effective to key said transistor on and off at the sub-harmonic frequency.

2. A frequency multiplier circuit of the keyed and phase controlled type comprising a transistor, and first and second tank circuits connected to be driven simultaneously by said transistor, said first tank circuit having a coil, means connecting one terminal of said coil to an electrode of said transistor, and means establishing a virtual ground in said coil at a point between the end terminals thereof, said second tank circuit being connected to said virtual ground point, said first tank circuit being tuned to a frequency of at least ten times the frequency to which said second tank circuit is tuned.

References Cited

UNITED STATES PATENTS 2,74,048 3/1956 Stricker ----------- 331—164 X

ROY LAKE, *Primary Examiner.*

S. H. GRIMM, *Assistant Examiner.*

U.S. Cl. X.R.

331—117, 173, 179